United States Patent
Arnault et al.

(10) Patent No.: US 11,655,865 B2
(45) Date of Patent: May 23, 2023

(54) SEPARATING DEVICE AND USE OF THE DEVICE FOR SEPARATING AND COLLECTING BRAKE DUST

(71) Applicants: Sogefi Filtration, Guyancourt (FR); TALLANO TECHNOLOGIE, Boulogne Billancourt (FR)

(72) Inventors: Nicolas Arnault, Vélizy-Villacoublay (FR); Lucie Riviere, Coulvain (FR); Stephan Pignol, Clinchamps sur Orne (FR); Florent Collicard, Rennes (FR)

(73) Assignees: Sogefi Filtration, Guyancourt (FR); TALLANO TECHNOLOGIE, Boulogne Billancourt (FR)

( * ) Notice: Subject to any disclaimer, the term of this patent is extended or adjusted under 35 U.S.C. 154(b) by 19 days.

(21) Appl. No.: 17/438,071

(22) PCT Filed: Mar. 4, 2020

(86) PCT No.: PCT/HR2020/050428
§ 371 (c)(1),
(2) Date: Sep. 10, 2021

(87) PCT Pub. No.: WO2020/183092
PCT Pub. Date: Sep. 17, 2020

(65) Prior Publication Data
US 2022/0252117 A1    Aug. 11, 2022

(30) Foreign Application Priority Data
Mar. 11, 2019   (FR) ..................................... 19 02459

(51) Int. Cl.
*F16D 65/00*   (2006.01)
*B60T 17/00*   (2006.01)
(Continued)

(52) U.S. Cl.
CPC ............ *F16D 65/0031* (2013.01); *B04C 5/08* (2013.01); *B60T 17/002* (2013.01); *B04C 5/06* (2013.01)

(58) Field of Classification Search
CPC ..... F16D 65/0031; B60T 17/002; B04C 5/08; B04C 5/06
See application file for complete search history.

(56) References Cited

U.S. PATENT DOCUMENTS 2,731,102 A * 1/1956 James ..................... B04C 11/00
                                                      55/DIG. 32
4,478,708 A * 10/1984 Farnsworth ............ C10G 11/18
                                                      95/271
(Continued)

FOREIGN PATENT DOCUMENTS

CN       101653345 A  *  2/2010  .......... A47L 9/1608
DE       4240873 A1      6/1994
(Continued)

OTHER PUBLICATIONS

CN 101653345 A. (Year: 2010).*
(Continued)

*Primary Examiner* — Thomas J Williams
(74) *Attorney, Agent, or Firm* — Maier & Maier, PLLC

(57) ABSTRACT

A separating device that receives via a lower inlet an air flow laden with impurities, namely dust produced by pads of a brake assembly, and makes it possible to separate and collect heavy dust. The housing of the device contains a multi-cyclone cluster, with cyclones distributed annularly and supplied tangentially by a central collector surmounting an axial duct communicating with the inlet. The centrifuged and separated liquid and solid particles are directly collected below the cyclones in a trapping zone around the duct, the cluster forming a transverse barrier connected in a sealed manner to the duct so as to prevent the liquid collected in the (Continued)

trapping zone from rising towards a downstream zone, only gravity discharge orifices of the cyclones allowing the trapping zone to be filled during the operation of the device.

17 Claims, 7 Drawing Sheets

(51) Int. Cl.
    *B04C 5/08*     (2006.01)
    *B04C 5/06*     (2006.01)

(56) References Cited

U.S. PATENT DOCUMENTS

| | | | | |
|---|---|---|---|---|
| 5,362,379 | A | * | 11/1994 | Helstrom ............... B01J 8/0055 208/113 |
| 7,955,405 | B2 | * | 6/2011 | Smith ....................... B04C 5/12 55/346 |
| 11,592,067 | B2 | * | 2/2023 | Arnault ............. B01D 46/4272 |
| 2006/0254226 | A1 | * | 11/2006 | Jeon ........................... B04C 5/24 55/345 |
| 2017/0198772 | A1 | | 7/2017 | Rocca-Serra |

FOREIGN PATENT DOCUMENTS

| | | | | |
|---|---|---|---|---|
| DE | 19643869 C2 | * | 10/2001 | ............. B08B 15/04 |
| DE | 202005006844 U1 | | 7/2005 | |
| DE | 202008009717 U1 | | 11/2009 | |
| DE | 102017201736 A1 | | 8/2018 | |
| FR | 1188672 A | * | 9/1959 | ............... B04C 5/06 |
| FR | 3046644 A1 | | 7/2017 | |
| GB | 2199267 A | | 7/1988 | |
| GB | 2508539 A | | 6/2014 | |
| GB | 2518765 A | * | 4/2015 | ........... B01D 21/267 |
| KR | 100577680 B1 | * | 5/2006 | ........... A47L 9/1641 |
| KR | 20090084615 A | * | 8/2009 | ........... A47L 9/1641 |

OTHER PUBLICATIONS

DE 19643869 C2. (Year: 2001).*
International Search Report (with English translation) and Written Opinion (with machine translation) dated Oct. 15, 2020 in corresponding International Application No. PCT/FR2020/050428; 11 pages.

* cited by examiner

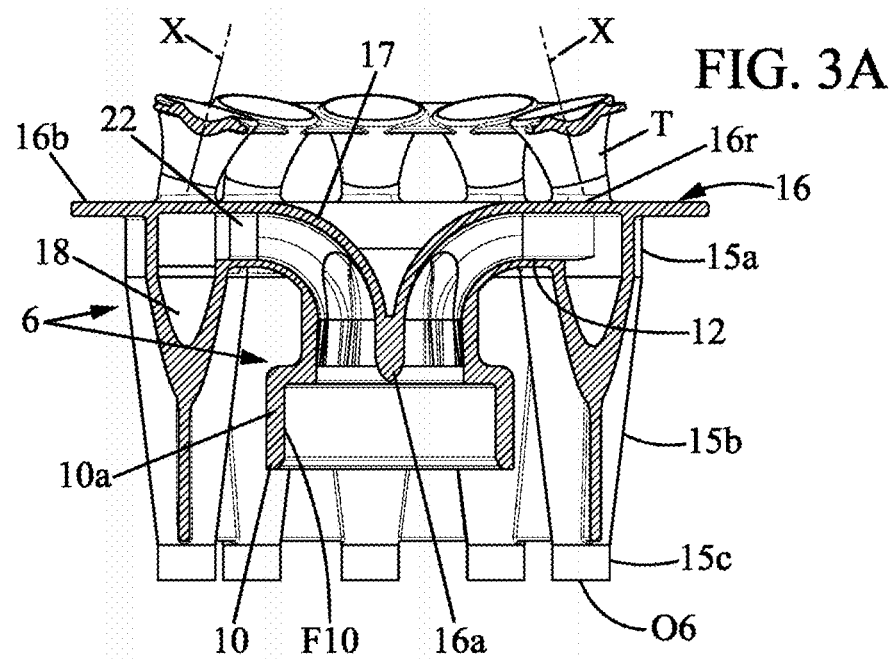
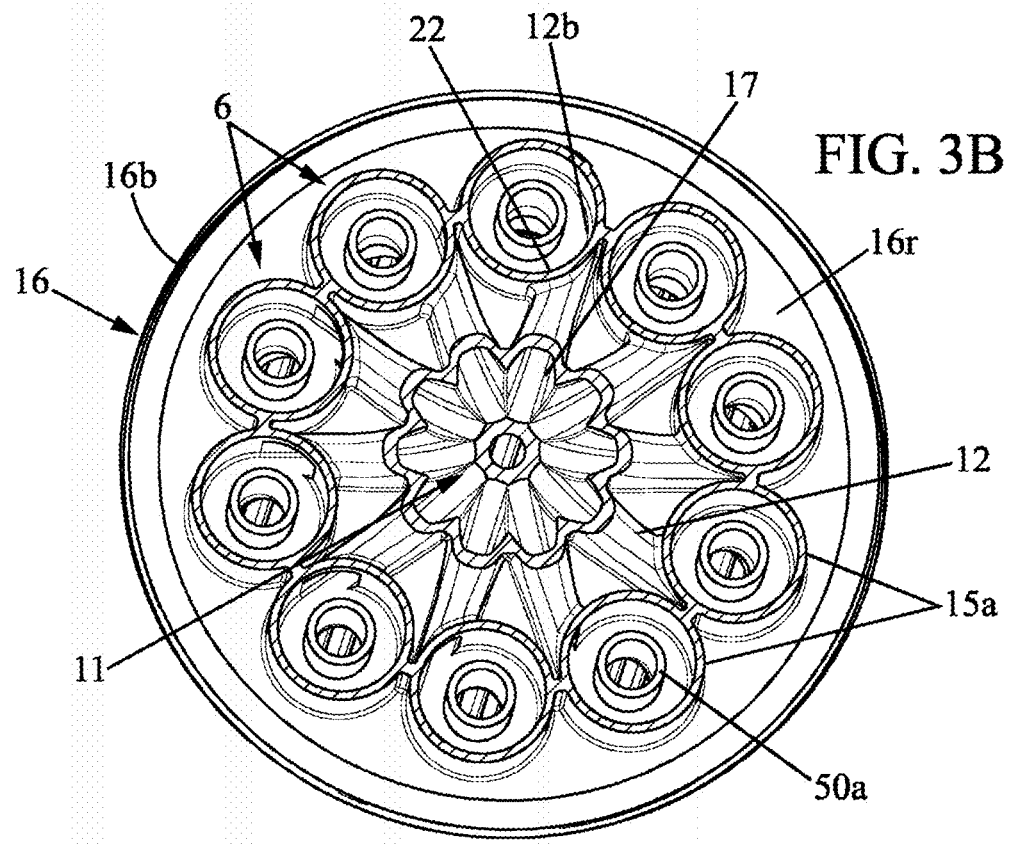

SEPARATING DEVICE AND USE OF THE DEVICE FOR SEPARATING AND COLLECTING BRAKE DUST

FIELD

The present invention relates to devices for separating contaminants generated during braking, typically through the action of pads against a rotor disk rotating about an axis. The field of application of the invention relates in particular to the separation of dust and water in order to render a brake assembly non-polluting during the braking of a road vehicle (for example an automobile, a heavy goods vehicle, a motorbike) or a rail vehicle (a train, a tram, an underground train).

BACKGROUND

As is known per se, there is a need to process the dust and particles that result from abrasion in friction braking systems. The dust and particles may first of all be captured by aspiration, as described for example in document DE 42 40 873 C2 or in document FR 3 046 644 and the flow is then filtered against a filter membrane/wall. It is also known practice, according to document DE 20 2008 009 717 U1, to collect and hold the dust and particles in the filter media, for example which has a U-shaped cross section, which filter media is mounted as close as possible to the caliper support.

Document DE 10 2017 201736 describes the installation of a simple cyclone to separate brake particles. However, the separation effectiveness remains limited.

In practice, systems involving filter media are not particularly effective in the long term. When the filter media is situated too close to the braking zone, the temperatures may reach around 600° C., which limits the choice of filter media and reduces the pollutant-reduction performance.

In addition, the dust and particles captured often form a disparate mixture, particularly when there is also water present. Liquid saturation of the filter membrane encourages premature clogging for example.

There is therefore a need for reliable and robust solutions which offer a good compromise between effectiveness and suitability for the complexity of the types of dust and particles that are to be separated, throughout the life of the separation device.

It is also desirable to limit the risk of clogging or pressure drop when the flow of air that is to be purified is laden with water.

SUMMARY

It is an object of the present invention to alleviate one or more of the aforementioned disadvantages by proposing a more effective separation device for suitably separating the pollutants resulting from a mixture collected in the braking zone. To that end, the invention relates to a device for separating brake dust and particles, for collecting dust and particles produced by one or more pads of a brake assembly, the device comprising:

a casing having an inlet for admitting a flow of air laden with brake dust and particles, and an outlet for discharging purified air, the casing comprising a tubular lateral wall extending around a longitudinal axis and an end wall, separation means, spaced axially away from the end wall to retain at least some of the brake dust and particles admitted via the inlet, a trapping zone for trapping the dust and particles separated by the separation means, and a downstream zone delimited by the separation means in the casing, the downstream zone being situated, at least in part, axially at the opposite end from the inlet and/or from the trapping zone, having the particular feature that the separation means comprise a group of cyclones, housed in the casing and able to separate dust and particles, as well as water/liquid droplets present in the flow of air admitted via the inlet, each of the cyclones comprising a body that tapers in the downward direction, having a lower end opening via a gravity discharge orifice into said trapping zone, said body delimiting a separation chamber, the group comprising:

an axial supply inlet common to the cyclones of the group, and provided with a connector for an axial duct allowing the flow of air admitted via the inlet to circulate as far as the group of cyclones from beneath;

a plurality of exhaust stacks each discharging air from a separation chamber and opening into the downstream zone inside the casing; and an intake manifold having a plurality of tubular branches to distribute said flow of air laden with dust and particles, extending between the axial supply inlet and each respective separation chamber of the cyclones, each of the tubular branches opening radially into a corresponding separation chamber, all the bodies of the cyclones being placed radially distant from the longitudinal axis, between the longitudinal axis and the lateral wall.

Typically, the group of cyclones forms a transverse barrier connected in a fluidtight manner to the axial duct, the transverse barrier and the axial duct preventing a heterogeneous liquid-solid mixture from traveling back up toward the downstream zone during operation of the device. As a preference, only the gravity discharge orifices are able to fill the trapping zone with a heterogeneous liquid-solid mixture during operation of the device. Thus, in the event of a jolt during a phase in which the vehicle is running, contamination of the downstream zone is avoided.

Advantageously, the inlet to the device is formed at the bottom of the casing and the axial duct causes the flow to circulate, preferably linearly, as far as a zone of connection of the intake manifold. With this type of arrangement, it is possible to form a device that is compact in terms of width, having a small cross section of casing by splitting the flow into as many flows as there are cyclone cells (these cells being mounted in parallel). Furthermore, when a filtration stage, centralized or provided in the casing (downstream of the centrifugal separation means), is incorporated, the device is able very effectively to process all of the brake dust and, in particular, the metallic particles on the one hand, and the dust and fine particles of variable size on the other hand, even when there is water present.

The separation or preseparation permitted by the group of cyclones can thus be effective, by making it easier for all the heavy dust or particles to fall under the effect of gravity, making it possible to improve the life of a filtration stage situated downstream of these separation means. In all that follows, the heavy dust or particles should be understood as meaning dust or particles of relatively large size which therefore drop quickly under the effect of gravity. Recourse to branches for tangentially guiding the flow around each substantially vertical axis of the cyclones provides the possibility of exerting a centrifugal force which contributes to increasing, by agglomeration, the size of the dust pushed toward the outside on the one hand, and serves to make it easier for this dust to drop under gravity via the gravity discharge orifice, on the other hand.

According to one particular feature, the group of cyclones forms a structural unit that can be inserted as a single piece into the interior volume of the casing.

As a preference, the group of cyclones forms a multi-cyclone structural unit that can be fitted in a fluidtight and centered manner onto the axial duct formed as an internal axial projection in a bowl belonging to the casing.

The intake manifold allows the flow to be distributed symmetrically. The separation device can therefore limit the length of the circulation path followed by the flow that is to be processed in the group of cyclones, while at the same time having good effectiveness, in the knowledge that the flow is distributed radially (via a first deviation effect which immediately precedes the cyclone effect) to a high number of cyclones, for example around ten cyclones.

The inlet of the device is preferably produced as an axial end of the axial duct, which is typically a cylindrical duct.

According to one particular feature, the exhaust shafts/stacks project upward with respect to a flange of the group allowing for mounting in the casing.

According to one option, the exhaust stacks project upward with respect to a flange of the group delimiting a top of the intake manifold, the exhaust stacks having convergent outlet orientations so as to move the air leaving the cyclones away from a lateral wall of the casing.

In embodiment options for the device according to the invention, recourse may also be had to one or more of the following arrangements:

the cyclones of the group comprise at least six cyclones.
the inlet of the device is situated at a lower axial end of the device and is lower than the level of any one of the gravity discharge orifices, and preferably lower than a low point of the trapping zone.
the trapping zone has a subcompartment for collecting liquid, particularly water, a filter media (optionally with a coalescing effect) being interposed between the compartment and the rest of the trapping zone.
the subcompartment includes a port for discharging liquid filtered through the filter media, the port being arranged at a bottom point of the casing.
the cyclones are distributed in an annular configuration around the axial supply inlet common to the cyclones.
each of the tubular branches opens radially (outward/centrifugally) into a corresponding separation chamber.
the trapping zone into which all of the gravity discharge orifices open is delimited by the end wall of the casing.
the trapping zone extends around the axial duct in an annular configuration with a radial extension extending from the axial duct as far as the lateral wall.
the axial duct passes through the trapping zone to form the inlet and/or to cause the inlet to communicate with a zone of connection of the intake manifold via the axial supply inlet.
the number of cyclones may be greater than 6, for example around 8 or 10 cyclones.
the axial duct forms a male member that engages in a female connector formed as an integral part of the intake manifold, typically in an axial extension of the branching zone.
the axial duct forms a female member engaging in a male connector formed as an integral part with the intake manifold, typically in an axial continuation of the branching zone.
the separation means are produced as two parts or three parts each molded in a plastics material.
each body is selectively connected to a branch of the intake manifold, being formed as an integral part thereof, in a molded plastics material.
the group of cyclones comprises a transverse upper flange having an annular fixing portion for fixing in the casing, the upper flange forming upper radial parts at the top of each of the bodies of the cyclones.
each of the discharge stacks extends as an axial projection on each side of the upper flange.
there is an annular region formed along the intake manifold and which is itself surrounded by the cyclones of the group, the fluidtight connection of the axial duct to the supply inlet of the intake manifold preventing the air from circulating radially in this annular region which extends directly above the trapping zone.
the trapping zone is a zone delimited by an end wall of the casing.
the casing contains a filtering element comprising a pleated medium and optionally a prefilter, for example based on a porous foam.

According to one particular feature, each of the exhaust stacks has:
a tubular insert projecting axially downward with respect to the upper flange, of which at least a portion faces a radial mouth of one of the branches of the intake manifold, extending into a separation chamber; and
a deceleration member having a flared shape that widens in the direction of the outlet, the deceleration member projecting axially upward with respect to a radial portion of the upper flange.

Typically, the deceleration members are oriented in the opposite direction with respect to an end wall of the casing, for example facing an inlet face of a filter media of a filtering element placed in the casing in the downstream zone.

Optionally, the filtering element is axially spaced/distant from an axial outlet of the casing, so as to delimit a clean zone in the hollow of a lid of the casing.

According to one option, the separator device may optionally further comprise a coalescing means arranged internally inside a tubular element connected by an elbow to the axial duct from beneath so as to separate out liquid before it enters the axial duct and/or before it enters the cyclones. Typically, the tubular element with coalescer extends horizontally, while the axial duct extends vertically (just like the bodies of the cyclones which are vertically elongate).

Also proposed is an air separation unit to be mounted in series with/downstream of a brake dust collecting line, the separation unit comprising the brake dust and particles separation device according to the invention and further comprising at least one filtering element provided with a filter media, in the knowledge that the filtering element is incorporated internally inside the casing that houses the group of cyclones or else is placed in an independent casing downstream of the outlet of the casing.

Typically, each filtering element of the separation unit extends in the downstream zone inside the casing, delimiting:
an intermediate zone for the circulation of purified air leaving the cyclones, in communication with the exhaust stacks; and
a clean zone in communication with the outlet.

That yields an arrangement that is compact combining a number of separation functions in a brake dust recovery circuit during the phases in which a vehicle equipped with the device is running.

According to one particular feature, the filtering element has passing through it a flow of air which circulates parallel to the longitudinal axis through the filter media.

According to another particular feature, the filtering element has the shape of an annulus around a hollow interior space through which there passes a flow of air which circulates centripetally from a peripheral annular region included in the intermediate zone as far as the hollow interior space included within the clean zone.

According to one option, the separation means and an end wall of the casing delimit axially between them the trapping zone, which is in the form of an annular lower compartment of the casing.

As a preference, the at least one filtering element constitutes a trap for solid particles that are finer than the dust and particles stored in the trapping zone, the filtering element extending in an upper compartment of the casing, blocked axially against a casing component engagement edge and an annular end of the lid. The engagement edge may optionally consist of an internal annular shoulder of the casing component.

According to one option, the group of cyclones extends internally in a bowl of the casing, while the filtering element extends entirely above the bowl, the outlet of the casing being positioned axially or radially in a removable top lid of the casing, the top lid preferably being removable from the bowl which constitutes a stationary part connected directly to the vehicle.

With such an arrangement it is possible easily to fit and remove the filtering element, independently of the group of cyclones, possibly without a special-purpose tool. In a preferred option, clips or a screw thread may be provided for attaching the lid. In one option, the filter is designed as a non-removable unit and the filter assembly is changed during maintenance operations.

Typically, the filter media is pleated, forming fold lines which are either perpendicular to the longitudinal axis or parallel to the longitudinal axis.

Optionally, the support structure supporting the filtering element forms a poka-yoke/foolproof means designed and arranged so that it is not possible to keep the lid closed (in a locked state) without the filtering element, there then being nothing to oppose a removal of the lid.

In one option, the first fixing members are inaccessible from outside the casing and comprise or consist of elastically deformable clip-fastening members able to disengage from the casing component in a modified orientation of the support structure.

The casing may optionally contain, in the clean zone, a turbine rotor able to aspirate the flow of air admitted via the inlet of the casing.

According to one particular feature, deflector means formed between the exhaust stacks and an inlet face of the filter media are provided. Optionally, the deflector means comprise:
    passage holes which are offset radially with respect to the exhaust stacks,
    and/or concave deflection portions having a concave surface for causing the flow of air leaving an exhaust stack to rotate, the concave deflection portions bordering or facing each exhaust stack of the cyclones.

The deflector means may potentially be supported by or extend parallel to a transverse wall parallel to an upper flange of the group of cyclones, the transverse wall.

Each of the deflector means may be of the type having a concave face facing a deceleration member of the exhaust stacks (a flared member projecting axially upward from an upper flange of the cyclone separation means).

According to one option, the separated particles are trapped in the casing and collected in a trapping zone of which the height, measured from the cyclones, is greater than the height of the body of the cyclones measured between the upper flange and the annular end forming the gravity discharge opening. Typically, the height of the trapping zone beneath the cyclones is less than the height of the downstream zone Z2 delimited by the casing, bearing in mind the volume occupied by the filtering element or elements.

More generally, it is advantageously possible to obtain a non-polluting brake assembly comprising:
    the air separation unit according to the invention,
    a caliper support,
    a rotor disk rotating about an axis,
    at least two mobile pads intended to come to press against the rotor disk in order to brake same under a brake-application force supplied by a caliper, the pads comprising friction material liable to release particles as a result of abrasion,
    a collector device arranged at least in part in the vicinity of the caliper support, the collector device comprising:
    at least one inlet, and
    a connecting element connected to an outlet of the collector device and in communication with the inlet of the casing of the air separation unit.

According to one option, the collector device has aspiration/suction means arranged at least in part in the vicinity of the caliper support, so that each inlet of the collector device is defined by an aspiration zone formed in the vicinity of each pad and delimited by a deflector.

According to another aspect, it is proposed a use of the separation device according to the invention in a vehicle or mobile plant that generates brake dust and particles, having the particular feature that the inlet formed by the casing defines a cannula to which a connecting element, preferably a flexible hose, is fixed, for the purposes of connection to a brake dust collector device, the casing being attached by fixing means to a strut of a suspension damper.

According to another aspect, it is proposed the use of the separation device according to the invention in a vehicle or mobile plant that generates brake dust and particles, having the particular feature that the trapping zone is formed by a lower stage of the separation device and serves to hold the brake dust and particles as well as liquid droplets which have been separated by the group of cyclones around an axial duct carrying a raw air flow upward directly into the intake manifold.

The separation of the solid dust/particles and of the water that the group of cyclones of the device permits may be a relatively coarse separation notably targeting the heaviest dust or particles, allowing subsequent use of a filtration stage the media or medias of which will become saturated less quickly (as water is not a compressible fluid and the large-sized dust is held in the trapping zone).

BRIEF DESCRIPTION OF THE DRAWINGS

Further features and advantages of the invention will become apparent during the following description of a number of embodiments, given solely by way of nonlimiting example, with reference to the attached drawings in which:

FIG. 3A is a view in longitudinal section showing the perspective from beneath, showing in greater detail the group of cyclones that can be used in the separation device of FIG. 1, in this instance with the bodies of the cyclones distributed in an annular configuration around an intake manifold;

FIG. 3B is a view in cross section showing the underside of a flange of the group of cyclones and the respective tangential inlets of the cyclones which are formed by the plurality of branches of the intake manifold;

DETAILED DESCRIPTION

There follows a detailed description of a number of embodiments of the invention, accompanied by examples and with reference to the drawings. In the various figures, identical references indicate elements that are identical or similar.

Figure 1:
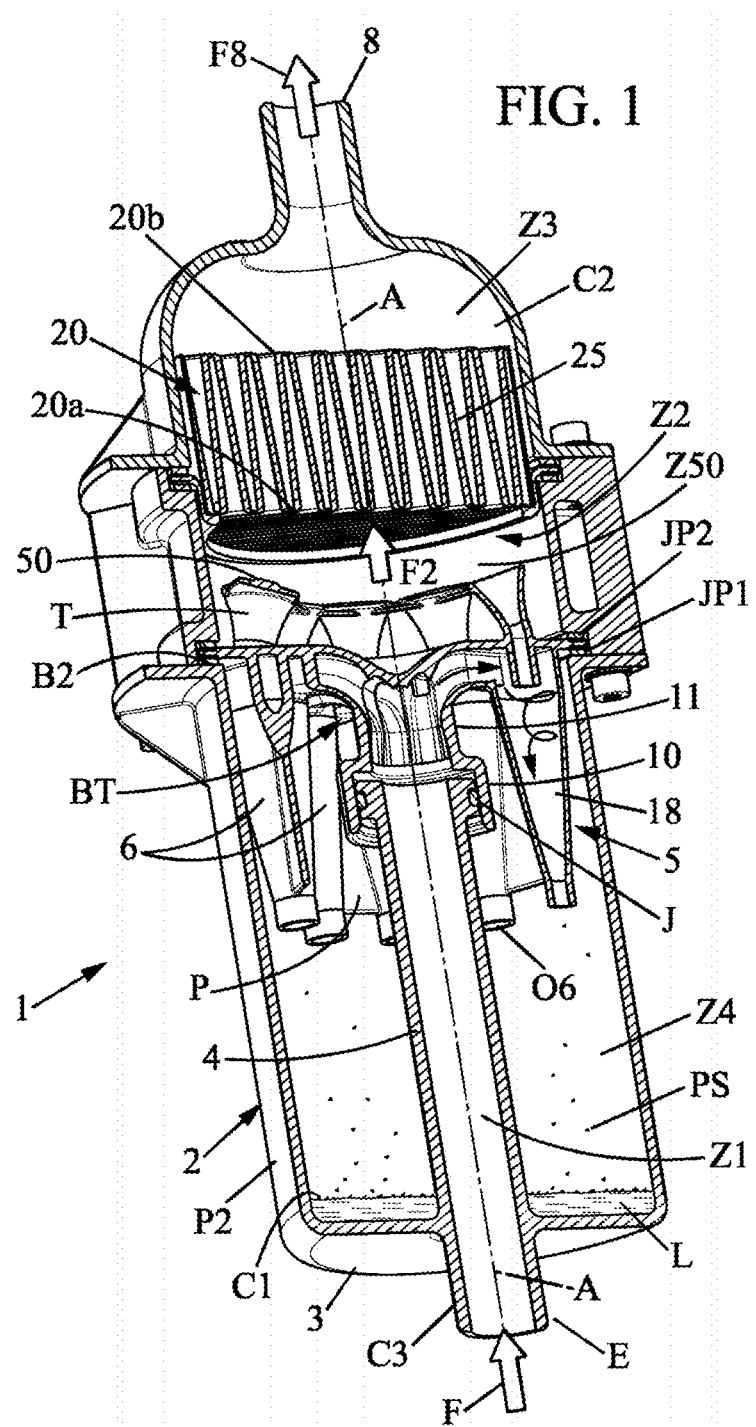
FIG. 1 illustrates a view in longitudinal section of a device for separating particles from an air flow, including a group of cyclones in a casing of the device, according to a first embodiment.
Figure 7:
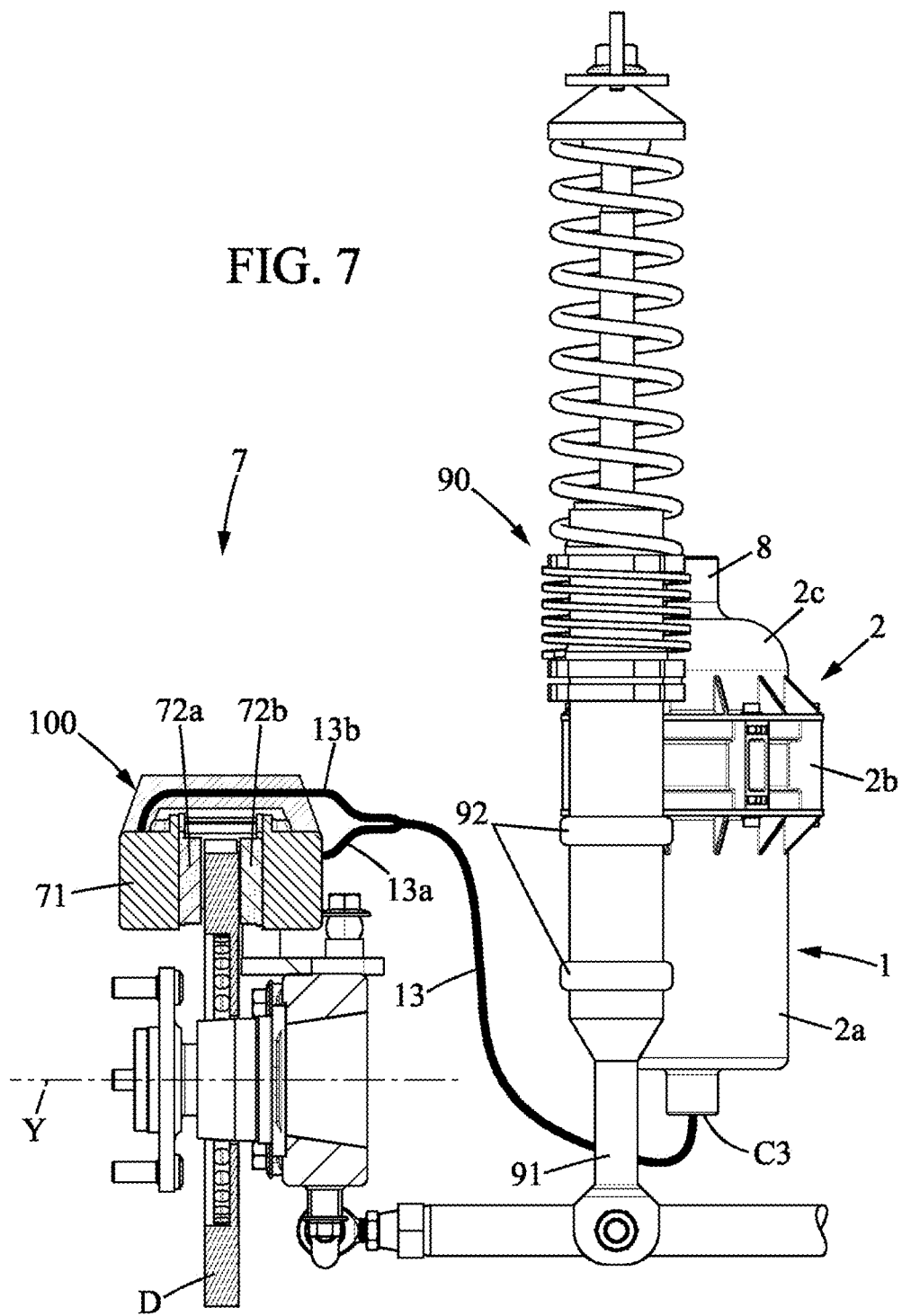
FIG. 7 illustrates an example of the use of the separation device of FIG. 1 in a brake assembly having a brake dust aspiration function.

Referring to FIGS. 1 and 7, a separation device 1 is provided intended to separate and collect dust and particles produced by pads 72a, 72b of a brake assembly 7. The device 1 comprises a casing 2 which has an upper wall and a lower wall.

As is clearly visible in FIG. 7, the casing 2 is connected interchangeably to one or possibly several ducts of a circuit supplying air laden with brake dust. This circuit is connected to a collector device 100 belonging to a brake assembly 7. In this instance, the collector device 100 has aspiration means arranged at least in part in the vicinity of the caliper support 71 associated with the rotor disk D, so that each inlet of the collector device 100 is defined by an aspiration zone formed in the vicinity of each pad 72a, 72b which engages with the rotor disk D. The inlet of the collector device 100 may be delimited by a deflector, for example as described in document FR 3 046 644.

An inlet E formed by the casing 2 may define a cannula C3 onto which a connecting element 13, in this instance a flexible hose, is fixed to connect to the collector device 100. The hose optionally is duplicated by two branches 13a, 13b so as to be able to collect the dust coming from the friction zones associated with the two pads 72a, 72b respectively.

The casing 2 may be secured to a component installed in the bottom part of the vehicle or mobile plant equipped with the brake assembly 7. In the example illustrated, the casing 2 is attached, by virtue of fixing means 92 (possibly resorting to screws/bolts), to a strut 91 of a suspension damper 90.

As illustrated in the view in longitudinal section of FIG. 1, the casing 2 comprises a lateral external wall P2 which extends from the end wall 3 as far as the upper wall of the casing 2, around a longitudinal axis A. The end wall 3 has passing through it a tube or similar piping member forming an axial duct 4, at a lower end E of the device 1. Optionally, an opening may be provided to allow water to be purged under gravity flow in the end wall 3.

The casing 2 of the device 1 may have a shape that is substantially tubular about a longitudinal axis A, which may be a substantially vertical central axis. In the nonlimiting example of the figures, the end wall 3 of the casing 2 is defined by or forms part of a bowl 2a, typically made of metal or of plastic, visible in FIG. 2. This bowl 2a may optionally form a stationary part in the example depicted. A cylindrical design of the lateral portion of the bowl 2a is used in the nonlimiting example of these FIGS. 1 and 2.

Figure 2:
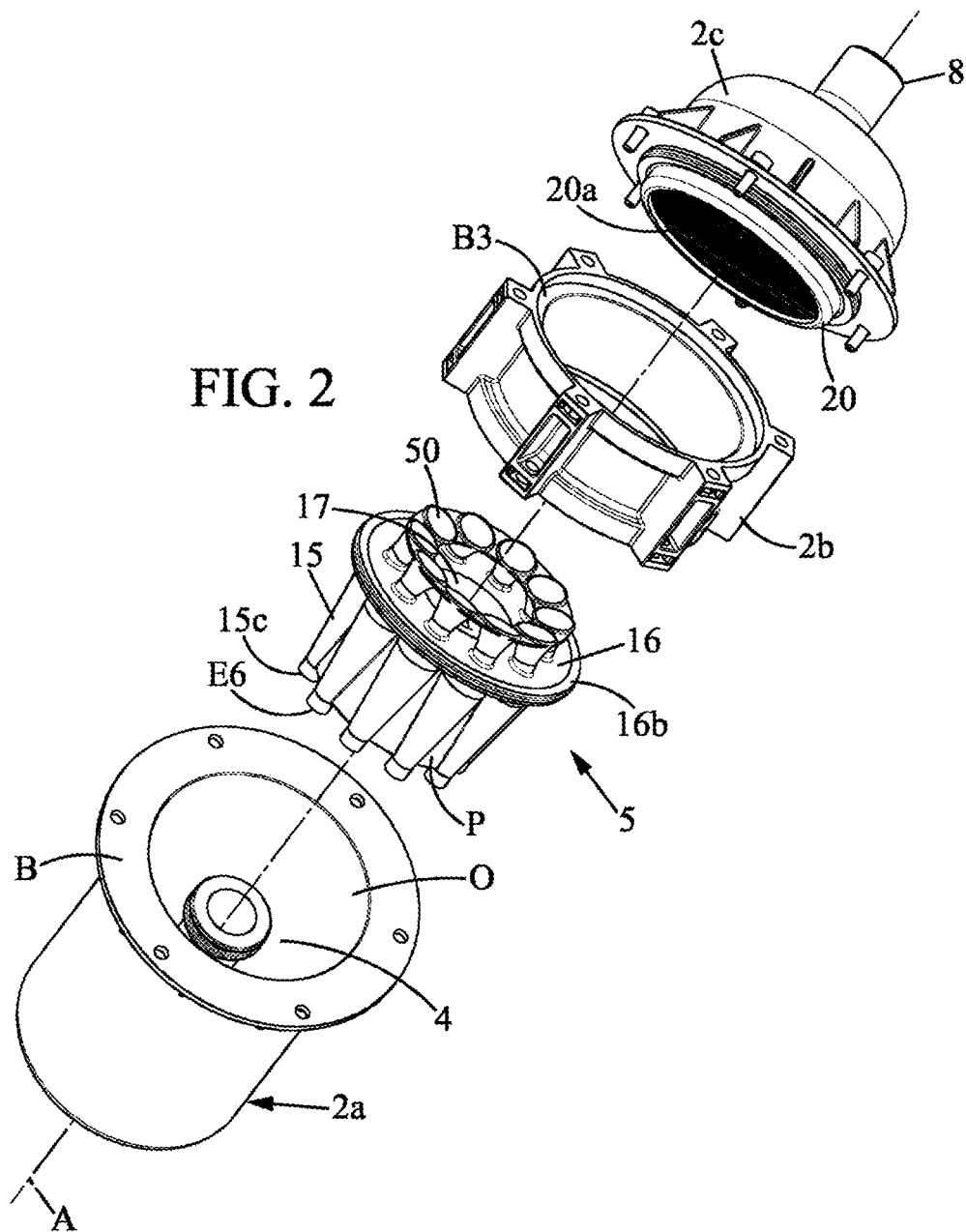
FIG. 2 is a view in exploded perspective showing an example of the setup of the device of FIG. 1, with a filter media situated inside the casing between the group of cyclones and an outlet of the device.

With reference to FIG. 2, the rest of the casing 2 is fixed removably with respect to this bowl 2a so as to close in a fluidtight manner the opening O of the bowl 2a. The upper wall is formed here by a lid 2c and optionally an intermediate casing component or annular part 2b, which are connected in a fluidtight manner to the bowl 2a (either directly or indirectly), in this instance by screwing as illustrated by the screws V, V' in FIGS. 4A-4B and 5 for example. The bowl 2a may have an annular flange B for the fixing using the screws. Alternatively, a male screw thread may be provided on the lid 2c to engage with a female screw thread formed in an upper end of a lateral wall of the bowl 2a. An upper opening is formed in this lid 2c by a cannula. More generally, it may be seen that the casing 2 has an outlet 8 which may be situated opposite the end wall 3. The example illustrated in FIG. 1 with a central cannula to form this outlet 8 is given merely by way of nonlimiting example.

In embodiment options, the lid 2c may have a flattened shape rather than a domed shape. Furthermore, the outlet 8 may correspond to an opening which may directly form an interior passage of a turbine. By way of example, the bowl 2a or similar casing component may be closed by an electric turbine 32, 33, 34.

Figure 9:
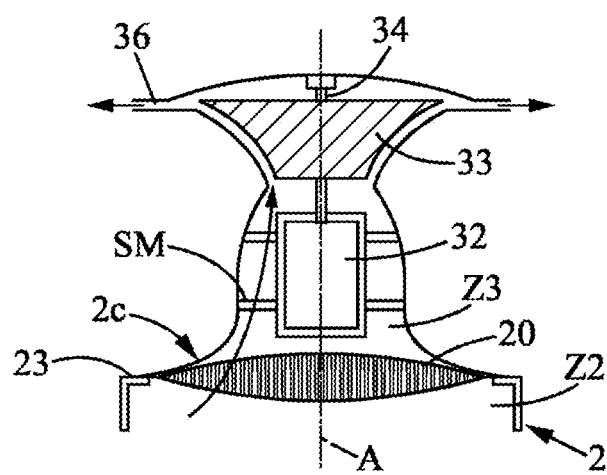
FIG. 9 illustrates schematically, in a view in longitudinal section, an example of the incorporation of motorized aspiration means in the casing, in this instance downstream of the group of cyclones.

FIG. 9 schematically illustrates one option for incorporating a turbine rotor 33 into the clean zone Z3 (which zone is typically adjacent to the outlet zone) downstream of a filtering element 20. The casing 2 may then have an upper compartment large enough to house this type of functional component in a position, for example, higher up than a fixing zone 23 to keep an annular edge of the filtering element 20 secured to the casing 2. The lid 2c may contribute to holding the filtering element 20 in place by attachment to the rest of the casing 2 while at the same time axially blocking the filtering element 2. In another option—as an alternative or in addition—the turbine rotor 33 may be positioned upstream of a filtration stage.

In FIG. 9, an electric motor 32, held inside the lid 2c by support means SM rendered secured to and/or formed as an integral part of the lid 2c is provided. The longitudinal axis A may intersect the optional filtering element 20, the electric motor 32 and the turbine rotor 33. A rotation shaft 34, defining an axis of rotation parallel to or coincident with the longitudinal axis A provides rotational drive for the turbine 33. This shaft 34 may extend internally inside the casing 2 (for example fully inside the casing 2, in this instance by being situated above the filter media 25 of the filtering element 20). The purified air of the zone Z3 can escape via radial passages 36 formed around the blades of the rotor 33.

With or without the presence of a turbine, the presence of at least one filtering element 20 is preferred so as to define a clean zone Z3 internal to the casing 2. The example of FIG. 9 shows a filtering element 20 mounted transversely, supported by a shoulder or a flange B of the casing 2. With or without the presence of an electric turbine, the filtering element 20 may be wider than it is tall (with a diameter greater than its height) while having an inlet surface area of the filter media 25 that is greater than the surface area available transversely in the casing 2, thanks to a pleating of this media 25.

In any event, a main separation of particles and dust from an incoming flow F is provided by separation means 5 of the cyclone type, such separation means 5 delimiting within the casing 2 an upstream zone Z1 in communication with the inlet E of the device 1, and a downstream zone Z2 in which a purified flow intended for the outlet 8 can circulate.

Thus, with reference to FIG. 1, provision is made for the separation device 1 to have, between the inlet E for admitting the flow F of air laden with brake dust and particles, and the outlet 8 for discharging purified air F8, separation means 5 which are spaced axially away from the end wall 3 and which are able to hold back at least some of the brake dust and particles admitted by the inlet E, causing this dust and these particles PS to drop into a trapping zone Z4. The separation means 5 are designed and arranged in such a way as to cause the air flow to rotate with a centrifugal effect, without having any moving part whatsoever in these separation means 5 and without having any filtering wall whatsoever (thus simplifying the design of these means 5 and limiting pressure drops).

In this instance, the trapping zone Z4 is delimited by the end wall 3 and the bottom of the lateral wall P2, extending below the separation means 5. The downstream zone Z2 delimited by the separation means 5 extends entirely above the separation means 5 in the casing, axially opposite the inlet E. If one or more filtering elements 20 is or are present in the downstream zone Z2, it will be appreciated that the clean zone Z3 in which the filtered air circulates constitutes a (typically upper) sub-zone of the downstream zone Z2.

The separation means 5 which subdivide the incoming flow F and which use a centrifugal effect to recover the most dense particles in the trapping zone Z4 will now be described in greater detail.

Referring to FIGS. 1, 2 and 3A-3B, the separation means 5 comprise or consist of a group of cyclones 6 which is housed in the casing 2 and able to separate the dust and particles, removing same via gravity discharge orifices O6. The cyclones 6 may be distributed about the one same common supply inlet 10 formed by or connected directly to the inlet E. In the example illustrated, the inlet E is formed by a cannula C3 projecting axially downward, it being possible optionally for the outlet to be formed in the top of the casing 2, and opening axially out of the lid 2c. The inlet E and the supply inlet 10 of the separation means 5 may be vertically aligned, having the longitudinal axis A passing through them.

Each of the cyclones 6 comprises a body 15 that tapers in the downward direction having a lower end 16 opening via a gravity discharge orifice O6 into the trapping zone Z4 delimited by a lower compartment C1 of the casing 2. The bodies 15 are grouped together in an annulus around the longitudinal axis A and around the supply inlet 10 common to all the cyclones 6 of the group. An intake manifold 11 is provided to distribute the flow F to the various cyclones 6 of which in the nonlimiting example of the drawings there are ten, this number typically being greater than six. The supply inlet 10 has a tubular connector 10a for connecting the intake manifold 11 to the duct 4 including the inlet E, by fitting these together axially. In one preferred embodiment, the duct 4 and the bowl 2a that forms the end wall 3 of the casing 2 may be produced as a single piece.

Stiffening walls P which connect pairs of adjacent bodies 15 in the group may be able to form a tubular internal partition running concentrically around the axial duct 4 that defines the inlet E. This non-perforated partition extends as far as an annular lower end E6 of the group of cyclones 6. The axial duct 4 fits together with the tubular connector 10a (in this instance a central connector) of the supply inlet 10 and in a fluidtight manner separates a downstream zone Z1 corresponding to the inside of the tube that forms this duct 4 and the trapping zone Z4 formed beneath the group of cyclones 6.

The formation of a continuous tubular internal partition, by the cyclones 6 and the stiffening walls P, may make it possible to prevent the heterogeneous mixture collected in the bottom of the compartment C1 from being splashed (if there is a jolt during the running of the vehicle on board which the device 1 is carried) toward annular seals contributing to the sealing of the connection between the group of cyclones 6 and the lateral wall P2 of the casing 2. A risk of premature aging of the seals may thus be avoided and/or this offers a greater range of choice of the seal to be used. It will be appreciated that this design is advantageous for obtaining a shielding effect that prevents raw substance from flowing back up, the walls P here being formed integrally with the bodies 15 of the cyclones 6.

Annular sealing contact is also achieved between a cylindrical bearing surface F10 of the connector 10a and an annular seal J fitted to an upper end of the axial duct 4, for example in a groove provided for that purpose. In this example, the axial duct 4 forms a male member that fits into a connector of female type formed integrally with the intake manifold 11, typically in an axial continuation of a branching zone of the intake manifold 11. In a variant, the axial duct 4 may also form a female member engaging in a tubular connector 10a of male type, formed integrally with the intake manifold 11, typically in an axial extension of the branching zone.

The separation means 5 formed by the cyclones 6, the common flange 16 and the manifold 11 may be produced in two or three parts each molded in a plastics material. For example, the flange 16 which includes the central part 17 belonging to the manifold 11 may be produced as a single piece. Optionally, all or some of the exhaust shafts/stacks 50 are also formed as one with the flange 16.

As can be seen in FIGS. 3A and 3B in particular, each cyclone 6 is supplied with raw air by an inlet 22 designed as the end, the distal end with respect to the longitudinal axis A, of one of the tubular branches 12 of the intake manifold 11. The branches 12 merge at a common branching point included within a tubular portion constituting the common supply inlet 10 of the intake manifold 11. Air which is (partially) purified can exit the separation chamber 18 of the cyclones 6 via the top, along an exhaust stack 50 connected to a top wall of the group of cyclones 6. Such a wall may constitute a flange 16 belonging to and used for the fixing of the group.

In FIGS. 3A and 3B, it may be seen that each body 15 comprises a cylindrical part 15a and a substantially conical convergent part 15b, at least one inlet 22 mounted tangentially on the cylindrical part 15a, a lower annular end 15c able to extend cylindrically the narrower bottom of the substantially conical convergent part 15b and an upper wall radial element covering the cylindrical part 15a from the top. The separation chamber 18 delimited by the body 15 thus narrows progressively in the downward direction. The orifice O6, formed at the bottom of the cyclone 6 in the annular end 15c, may be situated in vertical alignment with an air outlet of the cyclone 6 which outlet is formed by one of the exhaust stacks 50.

Here, an upper flange 16 is optionally provided to allow the group of cyclones 6 to be mounted on a receiving rim or edge B2 of the casing 2. The upper flange 16, which may be produced as a single piece, is provided with passages for the air ascending in the respective exhaust stacks 50 of the cyclones 6. The upper flange 16 may also form the crown 16a of an arch in a central part 17 surrounded by the exhaust stacks 50, so as to form a respective top of each of the branches 12 and a top of the branching zone (zone of divergence) of the intake manifold 11. The central part 17 forms the arch arcs. The central part 17 forms the top of the intake manifold 11. The profile of the respective branches 12 here is substantially a quarter of an annulus, so far as their profile viewed in longitudinal section of the device 1 is concerned. The arched lower part of the branches 12 is formed substantially at the same heightwise level as the crown 16a of the arch and axially joins the connector 10a of cylindrical shape.

The branching zone is, for example, central so as to distribute the flow centrifugally, in at least six distinct directions, for example ten distinct directions in the case of the drawings illustrated. The intake manifold 11 may therefore form a corresponding number of inlets 22 to deliver a tangential flow, centrifugally.

Each exhaust stack 50 of a cyclone 6 includes a tubular insert 50a projecting axially downward with respect to the upper flange 16, of which at least a portion faces a radial mouth 12b of one of the branches 12 of the intake manifold 11. The radial mouth 12b is offset to one side with respect to the central axis of the tubular insert 50a, as is clearly visible in FIG. 3B (having the shape of a "b" for the circulation path around each tubular insert 50a) so as to encourage a direction of rotation for the air admitted via the branch 12. This allows the air-flow fraction conveyed tangentially by this branch 12 to be deflected at the inlet 22 of the separation chamber 18, the air being made to rotate around the cylinder or tube formed by the insert 50a which (with a centrifuging effect) guides the dust and solid particles against the internal face of the body 15 to cause them to drop toward the orifice O6.

In FIGS. 1 and 3B, it may be seen that the group of cyclones 6 forms a transverse barrier BT with respect to the solid impurities PS collected in the trapping zone Z4. The dense distribution of the cyclones 6, of which there are ten here without significant separation/break in continuity in this distribution, improves the trade-off between compactness and effectiveness of separation.

In the nonlimiting example of the figures, the upper flange 16 provides fluidtight separation by delimiting the downstream zone Z2 with respect to the trapping zone Z4. In addition, the intake manifold 11 and the tubular wall of the axial duct 4 provide fluidtight separation of the upstream zone Z with respect to the trapping zone Z4. Only flows which have passed in succession through:
  the single supply inlet 10 (into which all of the laden flow F admitted by the inlet E is conveyed) and the centrifugal deflection branches 12 of the manifold 11,
  the separation chamber 18, and
  the exhaust stacks 50,
can pass through the flange 16.

It may be noted that the device 1 is able to limit the length of the circulation path of the flow to be processed while at the same time having good effectiveness in the knowledge that the flow is distributed radially, centrifugally by a first deflection effect, toward a high number of cyclones 6, for example ten cyclones 6.

A flange B of the bowl 2a forms, for example, the receiving edge B2. An annular border 16b of the flange 16 may, in one option, be trapped/sandwiched between two flat seals JP1, JP2 (visible in FIG. 1) between the receiving edge B2 and a casing component 2b superposed on the bowl 2a.

The exhaust stacks 50 may have a profile allowing the removal, with a deceleration effect, of the air which escapes naturally via the top of the separation chambers 18. For example, each of the exhaust stacks 50 extends as an axial projection on each side of the upper flange 16, forming a tubular deceleration member T, having a flared shape that widens in the direction of the outlet 8. The deceleration member T protrudes beyond the top of the substantially planar annular radial portion 16r of the upper flange 16 and is able to deflect the flow of air leaving a separation chamber 18 by being bent slightly inward, for example extending about an axis X which deviates from the vertical by 20 to 50°, as visible notably in FIG. 3A.

In embodiments that employ a filtering element 20 housed in the interior volume of the casing 2, the respective axes X defined by the deceleration members T intersect at a central point of intersection contained within the interior volume of the casing 2. It is preferable for the cyclones 6 to be symmetrical about the longitudinal axis A when the axial duct 4 is a central duct of the casing 2.

Ways of incorporating one or more filtering elements 20, typically into the interior volume of the casing 2, are described in greater detail in what follows.

In the case of FIGS. 1 and 2, a filtering element 20 designed to filter a flow of air laden with fine particles is placed downstream of the cyclone separator formed by the group of ten cyclones 6. It is able to halt the remaining brake particles that have not been separated/collected in the trapping zone Z4. The media 25 in this instance is pleated, with fold lines running perpendicular to the longitudinal axis A. This filtering element 20 has passing through it a flow F2 of air which circulates parallel to the longitudinal axis A, through the filter media 25, entering via an inlet face 20a which faces the outlets of the exhaust stacks 50, and exiting therefrom via an outlet face 20b of the filtering element 20. The outlet face 20b here runs parallel to the inlet face 20a.

Annular sealing between the intermediate zone Z50, situated just above the flange 16, and the clean zone Z3 delimited axially by the outlet face 20b and in communication with the outlet 8 (in this instance an axial outlet) is obtained in a peripheral contact zone. Such annular contact is achieved for example between an edge of a flange for supporting the media 25 and superposed portions of the lateral wall P2. In this instance, an internal engagement edge B3 is provided in an intermediate component 2*b*, and against this edge the lower face of the edge of the flange comes into abutment. The lid 2*c* then covers this edge of the flange and can be interposed and compressed between two seals, when the lid 2*c* is fixed (in this instance screwed) to the intermediate component 2*b*. This type of fixing of the lid 2*c* to an intermediate component 2*b* is illustrated also in FIGS. 4A, 4B, 5 and 6, achieving peripheral sealing between the filtering element 20 (via an annular border of a flange) and the lateral wall P2. Of course, sealing may be achieved in some other way, possibly using at least one flexible sealing lip formed on the flange and designed to engage in a fluidtight manner against an internal face of the lateral wall P2.

More generally, any type of filtering element 20 may be provided, in this instance in the casing 2, to separate fine particles conveyed at a speed lower than the speed of entry into the respective cyclones 6, thanks to the flared structure of the deceleration members T. The combined total cross-sectional area of the mouths of the exhaust stacks 50 may represent at least 140% of the combined total cross sectional area of the cylindrical passages 15*a* formed in the inserts 50*a*. As a preference, the flaring of the top end of the exhaust stacks 50 allows a progressive increase of between 180 and 250% in respect of the outlet passage cross section of each cyclone 6. This results in a very significant decrease in the speed of the particles conveyed in the air flow F2 on the inlet face 20*a* of the filtering element 20 facing the exhaust stacks 50.

Figure 4A:
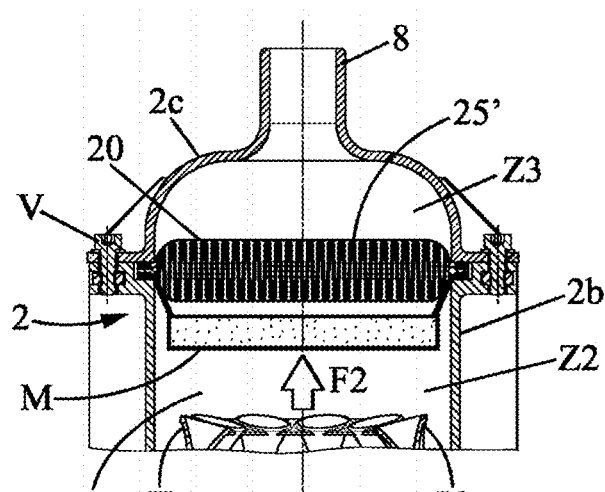
FIG. 4A is a detail view, in longitudinal section, of a filtration arrangement downstream of the cyclones of the group, according to a variant embodiment according to the invention.
Figure 4B:
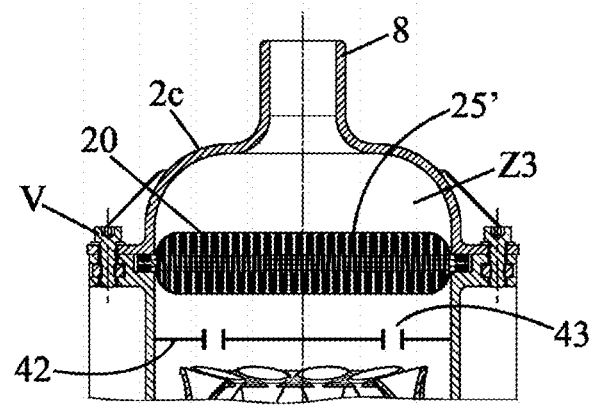
FIG. 4B is a detail view in longitudinal section of a filtration arrangement downstream of the cyclones of the group, according to another embodiment variant according to the invention.

Referring now to FIGS. 4A and 4B, at least one filtering element 20 is of a type enveloped in a capsule permeable to the air flow. This type of capsule is able to form a rigid support structure for a pleated media 25', in this instance pleated with fold lines perpendicular to the longitudinal axis A. This filtering element 20 has passing through it a flow F2 of air which circulates parallel to the longitudinal axis A, as in the case of FIG. 1, and is functionally similar. An annular flange of the capsule provides for fluidtight peripheral attachment.

Figure 5:
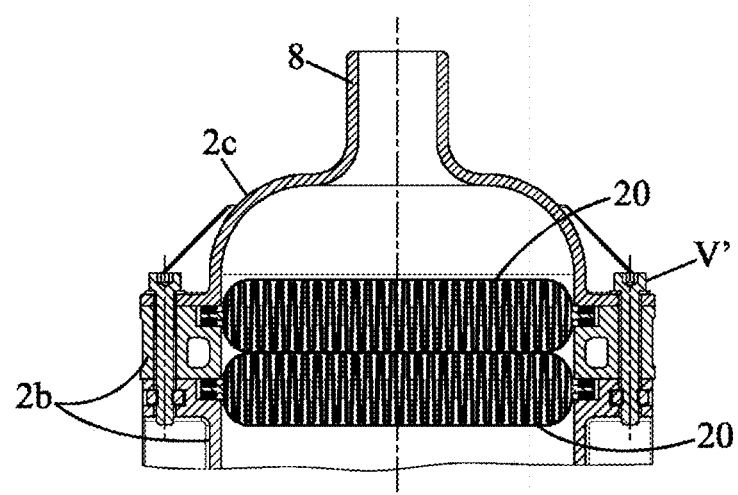
FIG. 5 shows the top of a separation device according to the invention, with a filtration assembly including several pleated medias each encased in a capsule that is permeable to the air flow.

As illustrated in FIG. 5, at least two filtering elements 20 of the capsule-format kind may be stacked, each forming a peripheral annular seal. Several intermediate components 2*b*, forming part of the casing, may also be stacked, potentially. It is also possible to provide a mounting ring for the filtering elements 20, the ring then having a simple peripheral flange which can be mounted as in the case of FIGS. 4A-4B, without forming an external portion of the casing 2.

Figure 6:
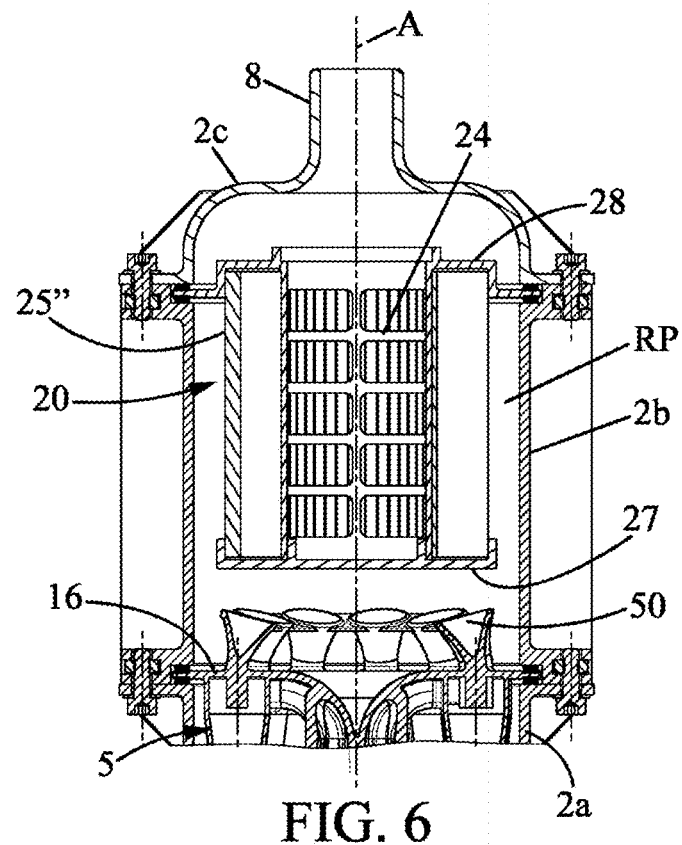
FIG. 6 is a view similar to that of FIG. 5, showing another embodiment for creating filtration between the group of cyclones and the outlet.

Referring to FIG. 6, the casing 2 may contain a filtering element 20 which has an overall shape of an annulus about a hollow interior space 24, extending about the longitudinal axis A in its mounted position. Such a filtering element for filtering fine dust has a pleated filter media 25" which may be positioned around a perforated stiffening cylindrical tube. The media 25" has passing through it a flow of air which circulates centripetally from a peripheral annular region RP included in the intermediate zone Z50 as far as the hollow interior space 24 included in the clean zone Z3. Two axial flanges 27, 28, one of them an annular upper flange 28, are able to support/fix the opposite axial ends of the filter media 25". One of these flanges 27, 28 is mounted in a fluidtight manner against the lateral wall P2, typically with annular contact against an intermediate component 2*b* that lies between the lid 2*c* and the bowl 2*a* forming the trapping zone Z4 and housing the separation means 5.

In this instance, the hollow space 24 in which the purified air F8 circulates emerges via the opening of the upper flange 28 toward the rest of the clean zone so as to be removed toward the outlet 8 of the casing 2, preferably maintaining a longitudinal upward direction. The lower flange 27 may be a blind flange, thus allowing the air flow leaving the exhaust stacks 50 to be deflected first of all centrifugally before arriving at the region RP and then filtered centripetally through the media 25".

Figure 8:
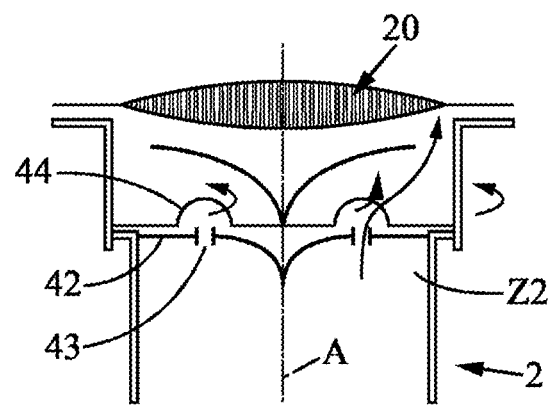
FIG. 8 schematically illustrates, in a view in longitudinal section, an embodiment detail of guide elements for guiding the respective flows of air leaving the outlets of the group of cyclones, such guide and/or impaction elements being able to discharge particles of dust from the air flow reaching an upper filtration stage.

In certain embodiments, the casing 2 has an intermediate internal compartment (in this instance between the compartments C1 and C2) above the exhaust stacks 50, in which compartment deflector means 42, 44 are mounted. FIG. 8 shows an example of the incorporation of deflector means 42, 44 between a filtering element 20 placed in the upper compartment and the separation means 5, for example at a junction with the lid 2*c*.

In order to avoid residual dust being thrown directly onto the inlet face 20*a* of the filtering element 20, a wall in the form of a parasol may be provided which serves to guide the flow of air leaving the exhaust stacks 50 onto the internal face of the lateral wall P2 of the casing 2. As a variant, such a deflection wall may consist of a simple flat disk, acting as an impactor. More generally, it is possible to choose a concavity facing up or facing down, or an arched shape similar to that of the central part 17 of the flange 16 to form a deflection wall facing the outlet orifices of the exhaust stacks 50.

With reference to FIG. 4A, it is also possible to provide a prefilter, in this instance in the form of a block of porous foam M which is secured to the filtering element 20. This type of prefilter may avoid the use of deflector means 42, 44 and/or may be used downstream of impaction and/or deflection walls.

In the nonlimiting example of FIG. 4B, a simple impaction-effect plate 42 is employed, which extends transversely in the interior volume of the casing 2, forcing the flow of air leaving the exhaust stacks 50 to enter orifices 43 which are offset toward the outside (or offset in any other way) with respect to the orientation—along the axes X—of the air flows coming from the exhaust stacks 50. The plate 42 facing the cyclones 6 may force the air flow to move quickly away from the deceleration members T and thus contribute to ensuring that less dust builds up on the top of the exhaust stacks as a result of the residual dust in the swirling air discharged at the orifices of the deceleration members T. This type of arrangement is compatible with the use of a prefilter as shown in FIG. 4A. Of course, the plate 42 may include first deflector means at the orifices 43 which are offset, possibly supplemented by second deflector means 44 which are, for example, spaced/axially spaced from the plate 42.

With reference to FIG. 8, a transverse component is provided which incorporates the deflector means, in this instance in the form of concave portions 44. The purpose of this component is to cause the fluid to rotate so as to eject the remaining dust (radially). A structure involving an inverted central cone may be advantageous to supplement the transverse component and form a last deflection wall, just before the inlet face 20*a* for access to the filter media 25. Such a structure involving an inverted central cone is able to accelerate the rotational speed of the fluid thus improving the separation effectiveness over time.

In that case, it is possible to use just one component to form the deflection walls shown in FIG. 8 and/or the portions 42, 43 may be omitted. In the absence of a wall 42, it is preferable to position the exhaust stacks 50 like the orifices 43 in FIG. 8 so that they work together with the concave deflection walls 44 that constitute the deflector means. Here there are as many concave walls, possibly each consisting of half or a quarter of a shell, as there are exhaust stacks 50.

In operation, as illustrated in FIGS. 1 and 3B, the device 1 operates in aspiration mode (thanks to a turbine 33, 34 mounted downstream, and which may or may not be incorporated into the casing 2) and the flow F of laden air enters the casing 2 via the lower inlet E. The cyclones 6 separate the solid particles PS present in the flow F which are then isolated in the trapping zone. If any liquid L is present, this too is aspirated upward so that it is conveyed directly to the supply inlet 10 (situated in vertical alignment with the inlet E) and subjected to centrifugal force as soon as it exits the branches 12 of the intake manifold 11, at the radial mouth 12*b*. This part of the separation is performed exclusively in the lower compartment C1.

The residual dust, with smaller particle size, and the fine particles are then conveyed with the air into the upper compartment C2, via the exhaust stacks 50 and may be deflected before the filtration stage incorporated internally into the casing 2. An insert may be provided, for example to prefilter or to avoid a direct path between the deceleration member T and the filter media 25, 25'. More generally, whatever the structure for incorporating the filtration stage into the upper compartment C2, what is thus formed is an air separation unit that remains effective over time and is highly suited to processing brake dust. The insert may be a deflector, a foam or a similar prefilter, or a perforated mesh.

One of the advantages of the separation device 1 is that it provides effective separation and groups together, in a relatively compact casing, several separation stages including a main separation using numerous cyclones 6. In practice, more than 80% of the solid brake particles (and dust) can be separated by the group of cyclones 6. The use of one or more filtering elements, downstream of such a group of cyclones, advantageously completes the separation by holding back the finest particles.

Through a separation unit combining cyclones 6 and filter media 25, typically within the one same casing 2, it is possible to reduce the very fine particles of road traffic in the knowledge that (at least as far as the West is concerned) 20% of road-traffic fine-particle emissions come from the brakes. It should be obvious to those skilled in the art that the present invention can be embodied in numerous other specific forms without departing from the field of application of the invention as claimed.

For example, although the casing 2 has been described as being generally of cylindrical shape in respect of its lateral wall P2, other geometries may be employed. Also, the lid 2*c* may be of a different shape and/or incorporate certain functions which have not been illustrated, for example by supporting the filtering element 20 via fixing tabs or similar member with framework for anchoring the filtering element 20 (such as the flange 28 or other suitable part). It will be appreciated that the device 1 allows a great deal of versatility in terms of the way in which the filtration stage is incorporated, it then being possible for the size of the upper compartment C2 to vary according to what is required.

The invention claimed is:

1. An air separation unit provided with a separation device for separating and collecting dust and particles produced by one or more pads of a brake assembly, the separation device comprising:
 a casing having an inlet for admitting a flow of air laden with brake dust and particles, and an outlet for discharging purified air, the casing comprising a tubular lateral wall extending around a longitudinal axis and an end wall;
 separation means, spaced axially away from the end wall to retain at least some of the brake dust and particles admitted via the inlet;
 a trapping zone for trapping the dust and particles separated by the separation means; and
 a downstream zone delimited by the separation means in the casing, the downstream zone being situated, at least in part, axially at an opposite end from the inlet and/or from the trapping zone,
 wherein the separation means comprise a group of cyclones, housed in the casing and configured to separate dust and particles, as well as water droplets present in the flow of air admitted via the inlet,
 wherein in the group of cyclones, each of the cyclones comprises a body that tapers in downward direction, having a lower end opening via a gravity discharge orifice into the trapping zone, the body delimiting a separation chamber,
 wherein the group of cyclones comprises:
 an axial supply inlet common to the cyclones of the group of cyclones, and provided with a connector for an axial duct allowing the flow of air admitted via the inlet to circulate as far as the group of cyclones from beneath;
 a plurality of exhaust stacks each discharging air from a separation chamber and opening into the downstream zone inside the casing; and
 an intake manifold having a plurality of tubular branches to distribute the flow of air laden with dust and particles, extending between the axial supply inlet and each respective separation chamber of said cyclones, each of the tubular branches opening radially into a corresponding separation chamber, all the bodies of the cyclones being placed radially distant from the longitudinal axis, between the longitudinal axis and the lateral wall,
 and wherein the group of cyclones forms a transverse barrier connected in a fluidtight manner to the axial duct, the transverse barrier and the axial duct preventing a heterogeneous liquid-solid mixture from traveling back up toward the downstream zone during operation of the separation device,
 wherein the air separation unit comprises:
 at least one filtering element provided with a filter media which extends in the downstream zone inside the casing, delimiting:
 an intermediate zone for the circulation of purified air leaving the cyclones, in communication with the exhaust stacks; and
 a clean zone in communication with the outlet;
 and wherein the air separation unit further comprises deflector means formed between the exhaust stacks and a transverse inlet face for access to the filter media, the deflector means comprising:
 passage holes which are offset radially with respect to the exhaust stacks,
 and/or concave deflection portions having a concave surface for causing flow of air leaving an exhaust stack to rotate, the concave deflection portions bordering or facing each exhaust stack of the cyclones.

2. The air separation unit as claimed in claim 1, wherein the cyclones of the group of cyclones comprise at least six cyclones, the inlet of the separation device being lower than the level of any one of the gravity discharge orifices, and/or wherein the cyclones are distributed in an annular configuration around the axial supply inlet common to the cyclones, each of the tubular branches opening radially into a corresponding separation chamber, the trapping zone into which all of the gravity discharge orifices open being delimited by the end wall of the casing, the trapping zone extending around the axial duct in an annular configuration with a radial extension extending from the axial duct as far as the lateral wall.

3. The air separation unit as claimed in claim 1, wherein the group of cyclones forms a multi-cyclone structural unit that can be inserted as a single piece in the interior volume of the casing.

4. The air separation unit as claimed in claim 1, wherein the separation means are produced as two parts or three parts each molded in a plastics material.

5. The air separation unit as claimed in claim 1, wherein each body is selectively connected to a branch of the intake manifold, being formed as an integral part thereof, in a molded plastics material.

6. The air separation unit as claimed in claim 1, wherein the group of cyclones comprises a transverse upper flange having an annular fixing portion for fixing in the casing, the upper flange forming upper radial parts at top of each of the bodies of the cyclones,
and wherein each of the exhaust stacks extends as an axial projection on each side of the upper flange.

7. The air separation unit as claimed in claim 6, wherein each of the exhaust stacks has:
a tubular insert projecting axially downward with respect to the upper flange, of which at least a portion faces a radial mouth of one of the branches of the intake manifold, extending into a separation chamber; and
a deceleration member having a flared shape that widens in the direction of the outlet.

8. The air separation unit as claimed in claim 1, wherein the filtering element has passing through it a flow of air which circulates parallel to the longitudinal axis through the filter media.

9. The air separation unit as claimed in claim 1, wherein the filtering element has the shape of an annulus around a hollow interior space through which there passes a flow of air which circulates centripetally from a peripheral annular region included in the intermediate zone as far as the hollow interior space included within the clean zone.

10. The air separation unit as claimed in claim 1, wherein the casing contains, in the clean zone, a turbine rotor able to aspirate the flow of air admitted via the inlet of the casing.

11. A non-polluting brake assembly comprising:
the air separation unit as claimed in claim 1,
a caliper support,
a rotor disk rotating about an axis,
at least two mobile pads intended to come to press against the rotor disk in order to brake same under a brake-application force supplied by a caliper, the two mobile pads comprising friction material liable to release particles as a result of abrasion,
a collector device arranged at least in part in the vicinity of the caliper support, the collector device comprising:
at least one inlet, and
a connecting element connected to an outlet of the collector device and in communication with the inlet of the casing of the air separation unit.

12. The non-polluting brake assembly as claimed in claim 11, wherein the collector device has aspiration means arranged at least in part in the vicinity of the caliper support, so that each inlet of the collector device is defined by an aspiration zone formed in the vicinity of each of the two mobile pads and delimited by a deflector.

13. A vehicle or mobile plant that generates brake dust and particles, comprising the air separation unit as claimed in claim 1, wherein the inlet defines a cannula to which a connecting element is fixed, for the purposes of connection to a brake dust collector device, the casing being attached to a strut of a suspension damper.

14. A vehicle or mobile plant that generates brake dust and particles, comprising the air separation unit as claimed in claim 1, wherein the trapping zone is formed by a lower stage of the separation device and serves to hold the brake dust and particles as well as liquid droplets which have been separated by the group of cyclones around an axial duct carrying a raw air flow upward directly into the intake manifold.

15. The air separation unit as claimed in claim 1, wherein the separation means consist of the group of cyclones.

16. The air separation unit as claimed in claim 1, wherein the group of cyclones forms a multi-cyclone structural unit fitted in a fluid tight and centered manner over the axial duct formed as an internal axial projection in a bowl belonging to the casing.

17. The air separation unit as claimed in claim 1, wherein the casing is provided with a flexible hose connected to the axial duct for brake dust and particles circulation,
and wherein the casing is fixedly attached to a strut of a suspension damper that belongs to a vehicle or mobile plant.

* * * * *